United States Patent Office 3,705,218
Patented Dec. 5, 1972

3,705,218
O-ETHYL-S-PROPYL-S-PHENYL-DITHIOPHOSPHATES
Shigeo Kishino, Akio Kudamatsu, and Kouzo Shiokawa, Tokyo, Japan, assignors to Bayer Aktiengesellschaft, Leverkusen, Germany
No Drawing. Filed Dec. 23, 1970, Ser. No. 101,139
Claims priority, application Japan, Dec. 25, 1969, 44/103,795
Int. Cl. C07f 9/18; A01n 9/36
U.S. Cl. 260—964                    9 Claims

ABSTRACT OF THE DISCLOSURE

O-ethyl-S-propyl-S-phenyl-dithiophosphates wherein the phenyl group is optionally substituted by halogen or lower alkyl, which possess arthropodicidal, especially insecticidal and acaricidal, properties.

---

The present invention relates to and has for its objects the provision of particular new O-ethyl-S-propyl-S-phenyl-dithiophosphates wherein the phenyl group is optionally substituted by halogen or lower alkyl, which possess arthropodicidal, especially insecticidal and acaricidal, properties, active compositions in the form of mixtures of such compounds with solid and liquid dispersible carrier vehicles, and methods for producing such compounds and for using such compounds in a new way especially for combatting pests, e.g. arthropods, especially insects and acarids, with other and further objects becoming apparent from a study of the within specification and accompanying examples.

In the agriculture of rice plants, the damage caused by larvae of insects belonging to the Lepidoptera, such as rice stem borer (*Chilo suppressalis*) and yellow rice borer (Tryporyza) is a serious problem. Various researches have been heretofore made with a view to controlling these harmful insects but only several insecticides, almost all of which comprise organic phosphorus compounds, among commercially available insecticides are effective against these harmul insects. Further, since the same insecticides have been used in great amounts, these harmful insects have tended to acquire resistance to these insecticides.

From the specification of Japanese patent publication No. 16875/63 it is known that O-ethyl-S-ethyl-S-(4-chlorophenyl)phosphorodithiolate, which has the formula

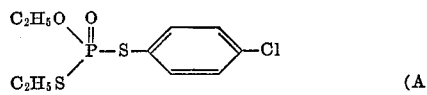

(A)

is a compound having an insecticidal activity.

The present invention provides dithiophosphoric acid esters of the general formula

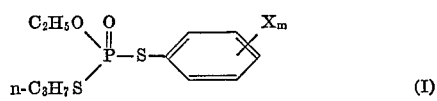

(I)

in which

X stands for a hydrogen or halogen atom or a lower alkyl group, and
$m$ is 1 or 2.

When the compounds of this invention are compared with known compounds having analogous formulae and compounds having similar directions of biological activity, the compounds of this invention are characterized by substantially improved effects and very low toxicity to warm-blooded animals, and hence, they are of great utility. By virtue of their characteristic structure, notwithstanding their relationship to known compound (A) noted hereinabove, the compounds of this invention exhibit an unexpectedly excellent insecticidal activity and can be used for controlling harmful insects of a broad range, such as harmful sucking insects, biting insects and plant parasites.

They are especially effective as insecticides against insects harmful to agriculture such as insects belonging to the Coleoptera, Lepidoptera, Aphidae, Orthoptera, Isoptera and Acarina, spider mites and harmful nematodes living in soil, and they can be used as agents for protecting plants from those insects.

The compounds of this invention exhibit a marked insecticidal activity against insects belonging to the Lepidoptera, whose control has been difficult by the conventional insecticides. Further, they exhibit a very high insecticidal activity against insects which have acquired resistance to known organic phosphorus compound insecticides; they are also effective for controlling rice stem borer. They have a very low toxicity; in particular, they do not exhibit an acute toxicity such as that possessed by parathion and methylparathion, the use of which is dangerous because of direct and indirect toxicity to humans. Nevertheless, the insecticidal activity of the compounds of this invention is comparable or superior to that of parathion and, therefore, they can be used as agricultural chemicals safely.

The present invention also provides a process for the production of a compound of the general Formula I in which (a) an O-ethyl-S-phenyl-dipthiophosphate of the formula

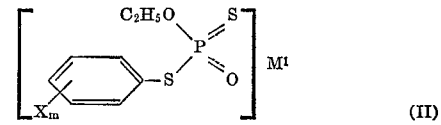

(II)

is reacted with an n-propyl halide of the formula $$n\text{—}C_3H_7 \text{ Hal} \qquad (III)$$

in which formulae

X and $m$ have the meanings given above,
$M^1$ stands for a metal equivalent or an ammonium group, and
Hal stands for a halogen atom, or (b) a thiophosphoric acid O,S-diester halide of the formula

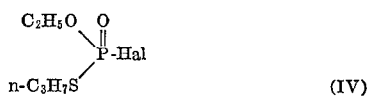
(IV)

is reacted with a thiophenol derivative of the formula

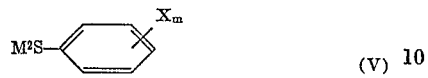
(V)

in which formulae

X and m have the meanings given above,
M² stands for a hydrogen atom, a metal equivalent or an ammonium group, and
Hal stands for a halogen atom.

The O-ethyl-S-phenyl-dithiophosphate of the Formula II may be prepared by reacting a dithiophosphoric acid diester halide of the formula

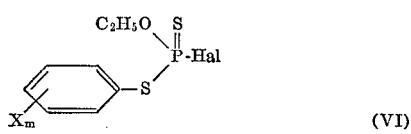
(VI)

in which Hal stands for a halogen atom,
with an hydroxyl compound of the formula $$M^1OH \quad (VII)$$

with the splitting off of the hydrogen halide.

X stands for a hydrogen atom or a halogen atom, for instance, fluorine, chlorine, bromine or iodine, or a lower alkyl group. Specific examples of suitable lower alkyl groups are methyl, ethyl, n- and iso- propyl and n-, iso-, sec- and tert- butyl. Preferably, X stands for a methyl or tert-butyl group or a chlorine atom.

M¹ and M² are preferably alkali metal atoms, such as sodium, potassium or lithium, or ammonium groups. Alternatively, M² may be a hydrogen atom.

Hal may be a halogen atom such as fluorine, bromine or iodine, or preferably chlorine.

In the synthesis of the compounds of this invention according to process variant (a) or (b), the reaction is preferably effected in a diluent, which term herein includes a solvent.

The preferred solvents and diluents include aliphatic and aromatic hydrocarbons (which may be halogenated) such as benzine, methylene chloride, chloroform, carbon tetrachloride, benzene, chlorobenzene, toluene and xylene; ethers such as diethyl ether, dibutyl ether, dioxane and tetrahydrofuran; and low boiling alcohols and ketones such as methanol, ethanol, isopropanol, acetone, methylethylketone, methylisopropylketone and methylisobutylketone. Lower aliphatic nitriles such as acetonitrile and propionitrile may be also used.

Process variant (b) may be carried out in the presence of an acid-binder according to need. Suitable acid-binders are carbonates, bicarbonates and alcoholates of alkali metals, such as $K_2CO_3$, $NaHCO_3$, $Na_2CO_3$ and methylates and ethylates of potassium and sodium, and aliphatic, aromatic and heterocyclic tertiary amines such as triethylamine, diethylaniline and pyridine.

The reaction may be carried out in the absence of an acid-binder by forming in advance a salt, preferably an alkali metal or ammonium salt, of the appropriate thiophenol and then reacting the salt with the appropriate phosphoric acid diester halide; the intended product of high purity can be obtained in high yield.

In either process variant (a) or (b) the reaction may be effected at a temperature within a broad range; generally, however, the reaction is carried out at from 0° to 110° C., preferably from 10° to 80° C.

The preparation of the compounds of this invention is illustrated in the following examples.

EXAMPLE 1

17 g. of potassium hydroxide are dissolved in 100 ml. of water and 200 ml. of dioxane are added to the solution. 40 g. of O-ethyl-S-(4-methylphenyl) dithiophosphoric acid chloride (B.P. 125°–128° C./0.3 mm. Hg and refractive index $n_D^{20}$ of 1.5989) are gradually added dropwise with stirring at 20°–30° C. The temperature of the reaction mixture is gradually raised and the stirring is conducted at 50° C. for 1 hour. Dioxane and water are removed by distillation under reduced pressure, and the residue is redissolved in water and benzene is added to the solution, followed by shaking. The water layer is concentrated under reduced pressure and the residue is dissolved in acetone, followed by removal of the inorganic salt by filtration. Distillation of acetone gives 35 g. of potassium O-ethyl-S-(4-methylphenyl) dithiophosphate.

29 g. of the so-formed potassium salt are dissolved in 100 ml. of alcohol and 13 g. of n-propyl bromide are added dropwise to the solution at 40° C. Stirring is conducted for 8 hours at 60°–70° C., followed by filtration of the inorganic salt and distillation of the alcohol. The residue is dissolved in benzene and washed with water and a 1% sodium carbonate solution. After dehydration with anhydrous sodium sulfate, benzene is distilled off and the residue is subjected to vacuum evaporation to obtain 23 g. of colorless oily O-ethyl-S-n-propyl-S-(4-methylphenyl)-phosphorodithiolate of the formula

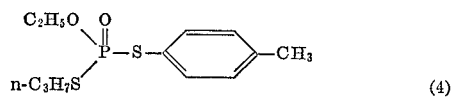
(4)

The product is characterized by a boiling point of 140°–145° C./0.05 mm. Hg and a refractive index $n_D^{20}$ of 1.5590. This compound is referred to hereinafter as compound No. 4.

EXAMPLE 2

14.5 g. of 4-chlorothiophenol are dissolved in 150 ml. of benzene and 10.1 g. of triethylamine are added thereto. Then the mixture is cooled to below 10° C. To the cooled mixture there are added dropwise 20.3 g. of 0-ethyl-S-n-propyl-thiophosphoric acid chloride with stirring. Stirring is continued for about 1 hour at room temperature. Then the reaction mixture is heated at 60° C. for 3 hours to complete the reaction. The reaction product is washed with water, a 1% acid solution and a 1% sodium carbonate solution and dried with anhydrous sodium sulfate. Benzene is distilled off and the residue is subjected to vacuum evaporation to obtain 24 g. of colorless oily O-ethyl-S - n - propyl-S-(4-chlorophenyl) phosphorodithiolate of the formula

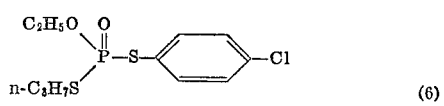
(6)

The product is characterized by a boiling point of 148°–153° C./0.1 mm. Hg and a refractive index $n_D^{20}$ of 1.5684.

The following compounds can be synthesized by analogous methods,

TABLE 1

| Compound number | Formula | Boiling point | (Refractive index) |
|---|---|---|---|
| 1 | $C_2H_5O$–P(=O)(S-n-$C_3H_7$)–S–$C_6H_5$ | B.P. 130–133° C./0.1 mm. Hg | ($n_D^{20}$ 1.5633) |
| 2 | $C_2H_5O$–P(=O)(S-n-$C_3H_7$)–S–$C_6H_4$–$CH_3$ (ortho) | B.P. 141–146° C./0.1 mm. Hg | ($n_D^{20}$ 1.5560) |
| 3 | $C_2H_5O$–P(=O)(S-n-$C_3H_7$)–S–$C_6H_4$–$CH_3$ (para) | B.P. 140–144° C./0.15 mm. Hg | ($n_D^{20}$ 1.5505) |
| 5 | $C_2H_5O$–P(=O)(S-n-$C_3H_7$)–S–$C_6H_4$–$C_4H_9$-tert | B.P. 150–154° C./0.15 mm. Hg | ($n_D^{20}$ 1.5250) |
| 7 | $C_2H_5O$–P(=O)(S-n-$C_3H_7$)–S–$C_6H_3$–$Cl_2$ (2,4) | B.P. 160–165° C./0.05 mm. Hg | ($n_D^{20}$ 1.5792) |

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide formulations or compositions such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, dimethylnaphthalene, aromatic naphthas, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, chloroethylene, carbon tetrachloride, etc.), cyclohexane, alcohols (e.g. methanol, ethanol, propanol, butanol, etc.), amines (e.g. ethanolamine, etc.), ethers, ether-alcohols (e.g. glycol monomethyl ether, etc.), strongly polar solvents such as acetonitrile, amides (e.g. dimethyl formamide, etc.), sulfoxides (e.g. dimethyl sulfoxide, etc.), ketones (e.g. acetone, methylethylketone, cyclohexanone, etc.) and/or water; as well as inert dispersible finely divided solid carriers, such as ground natural minerals (e.g. kaolines, alumina, silica, clays, attapulgite, montmorillonite, diatomaceous earth, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl polyglycol ethers, magnesium stearate, sodium oleate, etc.); and/or dispersing agents, such as lignin, sulfite waste liquors, methyl cellulose, etc.

As gaseous diluents or carriers there may be cited, by way of example, Freon and other aerosol propellants which are gaseous under normal conditions.

Such active compounds may be employed alone or in the form of mixtures with one another and/or with such solid and/or liquid dispersible carrier vehicles and/or with other known compatible active agents, especially plant protection agents, such as other insecticides and acaricides, nematocides, fungicides (including antibiotics) herbicides, bactericides, plant growth regulator, fertilizers and fertilizing substances, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–20%, preferably 0.01–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only about 15 to 1000 g./hectare, preferably about 40 to 600 g./hectare, are needed, and often amounts only up to about 1 quart/acre, preferably 2–16 fluid ounces of suspension/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore, the present invention contemplates methods of selectively killing, combating or controlling pests, e.g. arthropods, i.e. insects and acarids, and more particularly methods of combating at least one of insects and acarids which comprises applying to at least one of correspondingly (a) such insects, (b) such acarids, and (c) the corresponding habitat thereof, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples wherein the compounds are identified by the numbers given in Examples 1 and 2 and in Table 1:

EXAMPLE (i)

25 parts by weight of compound (2) of Table 1, 35 parts by weight of benzene, and 40 parts by weight of polyoxyethylene alkylphenol ether are mixed and stirred to prepare an emulsifiable concentrate. This formulation may be diluted with water to the desired concentration and then used as a ready-to-use-preparation.

EXAMPLE (ii)

25 parts by weight of compound (4) of Example 1, 70 parts by weight of diatomaceous earth and 5 parts by weight of alkylbenzene sulfonate are mixed and crushed to prepare a wettable powder. This formulation may be diluted with water to the desired concentration and then be used as a ready-to-use-preparation.

EXAMPLE (iii)

2 parts by weight of compound No. 6 of Example 2 and 98 parts by weight of clay are mixed and crushed to prepare a dust. This formulation may directly be used as a ready-to-use-preparation.

EXAMPLE (iv)

To a mixture consisting of 5 parts by weight of compound No. 6 of Example 2, 92 parts by weight of clay and 2 parts by weight of lignin sulfate, 25 parts by weight of water are added and the mixture is firmly kneaded. It is finely cut into granules of 0.5 to 1.5 mm., diameter by means of a granulating machine. The granules are then dried at a temperature between 40 to 50° C. to obtain a granular formulation. This formulation may directly be applied to the soil.

EXAMPLE (v)

0.5 part of weight of compound No. 1 of Table 1 and 99.5 parts by weight of kerosene are mixed and stirred to prepare an oil preparation. This formulation may directly be sprayed.

The activity of the compounds of this invention is illustrated in and by the following examples.

EXAMPLE A

Test 1.—Test on rice stem borers (*Chilo supressalis*) larvae

Solvent: 5 parts by weight of acetone

Emulsifier: 1 part by weight polyoxyethylene alkylarylether

To prepare a suitable preparation of the active compound, 1 part by weight of the active compound was thoroughly mixed with the stated amount of solvent and the stated amount of emulsifier. The obtained emulsifiable concentrate was then diluted with water to the desired concentration.

Test procedure.—Egg masses of rice stem borer were attached to paddy rice plants of tillering stage, 3 to 5 of which being in one pot of about 12 cm. diameter. 7 days after the hatching of the eggs, such plants were sprayed with the preparation of the active compound until dripping wet. 3 pots were used for each active compound at each concentration. The pots were placed in a greenhouse and the temperature was maintained at 25° C. Three days after the spraying, the stems of the plants were split by hand and the number of surviving dead insects in the stems were counted and the mortality rate was calculated as a percentage. 100% means that all the insects were killed, 0% means that none of the insects were killed.

The average results obtained are shown in the Table 2–a below.

Test 2.—Test on fall webworms (*Hyphantria cunea*) larvae

Test procedure.—Leaves of mulberry were dipped in the diluted preparation of the active compound prepared in the same manner described in Test 1 and then dried and put in a Petri dish of 9 cm. diameter. 10 fourth-instar fall webworm larvae were then placed in the dish. The dish was kept at a temperature of 25° C. 30 test insects were used altogether for each active compound at each concentration.

After 24 hours, the number of dead insects were counted and the mortality rate was calculated as a percentage. 100% means that all insects were killed, 0% means that none of the insects were killed.

The average results obtained are shown in the table below.

Test 3.—Test on tobacco cutworm (*Prodenia litura*) larvae

Test procedure.—Leaves of sweet potato were dipped in the diluted preparation of the active compound prepared in the same manner described in Test 1 and then dried and put in a Petri dish of 9 cm. diameter. 10 tobacco cutworm larvae were then placed in the dish. The dish was kept at a temperature of 28° C. 30 test insects were used altogether for each active compound at each concentration.

After 24 hours, the number of dead insects were counted and the mortality rate was calculated as a percentage. 100% means that all insects were killed, 0% means that none of the insects were killed.

The average results obtained are shown in the table below.

TABLE 2
[Results of comparative tests on insects belonging to Lepidoptera]

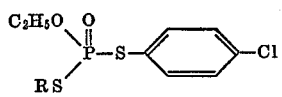

(IX)

| R | Killing ratio (percent) | | | | | |
|---|---|---|---|---|---|---|
| | Rice stem borers | Fall webworms | | Tobacco cutworms | | |
| | Active compound concentration | | | | | |
| | 250 p.p.m. | 1,000 p.p.m. | 300 p.p.m. | 100 p.p.m. | 1,000 p.p.m. | 100 p.p.m. |
| —$CH_3$ | 3.0 | 0 | 0 | | 0 | 0 |
| —$CH_2CH_3$ | 2.2 | 0 | 0 | 0 | 0 | 0 |
| —$CH_2CH_2CH_3$ (Compound No. 6) | 100 | 100 | 100 | 100 | 100 | 100 |
| —$CH(CH_3)_2$ | 10.2 | 30 | 0 | 0 | 0 | 0 |
| —$CH_2CH=CH_2$ | 8.6 | 0 | 0 | 0 | 10 | 0 |
| —$CH_2CH_2CH_2CH_3$ | 14.2 | 20 | 0 | 0 | 10 | 0 |
| —$C(CH_3)_3$ | 6.3 | 0 | 0 | | 0 | 0 |
| Untreated control | 0 | | 0 | | 0 | 0 |

From the results shown in Table 2 it can be seen that O-ethyl-S-n-propyl - S - substituted-phenylphosphorothiolates of this invention of the Formula I exhibit pronounced activity against harmful insects belonging to Lepidoptera over other analogous compounds.

The results of tests on the effectiveness of the compounds of this invention against various harmful insects are shown below in Tables 2–a, 2–b and 2–c in which the compound numbers correspond to those in Examples 1 and 2 and Table 1.

TABLE 2–a.—RESULTS OF TESTS ON RICE STEM BORERS

| Compound No. | Killing ratio percent 250 p.p.m. |
|---|---|
| 1 | 100 |
| 2 | 95.6 |
| 3 | 100 |
| 4 | 98.4 |
| 5 | 86.5 |
| 6 | 100 |
| 7 | 100 |
| Dipterex (comparison) | 97.7 |
| Baycid (comparison) | 100 |

TABLE 2-b
[Results of tests on fall webworms]

| | Killing ratio (percent) | |
|---|---|---|
| | 1,000 p.p.m. | 100 p.p.m. |
| Compound No.: | | |
| 1 | 100 | 90 |
| 2 | 100 | 100 |
| 3 | 100 | 80 |
| 4 | 100 | 100 |
| 5 | 100 | 30 |
| 6 | 100 | 100 |
| 7 | 100 | 50 |
| Comparison: | | |
| Dipterex | 100 | 90 |
| Baycid | 60 | 0 |

TABLE 2-c
[Results of tests on tobacco cutworms]

| | Killing ratio (percent) | | |
|---|---|---|---|
| | 1,000 p.p.m. | 300 p.p.m. | 100 p.p.m. |
| Compound No.: | | | |
| 1 | 100 | 100 | 30 |
| 2 | 100 | 100 | 90 |
| 3 | 100 | 60 | 40 |
| 4 | 100 | 100 | 90 |
| 5 | 100 | 60 | 0 |
| 6 | 100 | 100 | 100 |
| 7 | 100 | 60 | 0 |
| Comparison: | | | |
| Sumithion | 100 | 70 | 30 |
| Dipterex | 100 | 60 | 0 |

NOTES:
(1) Dipterex (commercially available product—comparison): O,O-dimethyl-2,2,2-trichloro-1-hydroxyethylphosphonate.
(2) Baycid (commercially available product—comparison): O,O-dimethyl-4-(methylthio)-3-methylphenylthiophosphate.
(3) Sumithion (commercially available product—comparison): O,O-dimethyl (3-methyl-4-nitrophenyl)thiophosphate.

EXAMPLE B

Test on carmine mites imagines (*Tetranychus telarius*)

Test procedure.—On the first two leaves of kidney bean seedlings, each of which were grown in pots of 6 cm. in diameter, 50–100 mature and infant carmine mites with organophosphorus acaricide resistance were placed. After 2 days, the preparation of the active compounds prepared in the same manner described in Test 1 was sprayed until dripping wet. The so-treated pots were then placed in a greenhouse at the temperature of 25° C. After 10 days, the controlling effect was evaluated according to the following scale:

Index number:
  3: No living imago, nymph or egg
  2: less than 5% of living imagines, nymphs and eggs based on the non-treated control
  1: 5–50% of living imagines, nymphs and eggs based on the non-treated control
  0: more than 50% of living imagines, nymphs and eggs based on the non-treated control The average results obtained are shown in the table below.

TABLE 3
[Results of tests on carmine mites]

| Compound No.: | Index number of carmine mite controlling effect as an active ingredient concentration of— | | |
|---|---|---|---|
| | 1,000 p.p.m. | 300 p.p.m. | 100 p.p.m. |
| 1 | 3 | 3 | 1 |
| 2 | 3 | 3 | 1 |
| 3 | 3 | 3 | 2 |
| 4 | 3 | 3 | 3 |
| 5 | 3 | 2 | 2 |
| 6 | 3 | 3 | 3 |
| 7 | 3 | 3 | 2 |
| Comparison: | | | |
| Phenkaptone | 2 | 0 | 0 |
| Malathion | 1 | 0 | 0 |

NOTES:
(1) The compound numbers in the table correspond to those in Examples 1 and 2 and Table 1.
(2) Phenkaptone (commercially available product—comparison): O,O-diethyl-S-(2,5-dichlorophenylthiomethyl)dithiophosphate.
(3) Malathion (commercially available product—comparison): O,O-dimethyl-S-(1,2-dicarboethoxy)ethyl dithiophosphate.

It will be realized that all of the foregoing compounds contemplated by the present invention possess the desired selective pesticidal, especially arthropodicidal, i.e. insecticidal or acaricidal, properties for combating insects and acarids, and that such compounds have a low phytotoxicity and a corresponding low mammalian toxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. Dithiophosphoric acid esters of the general formula

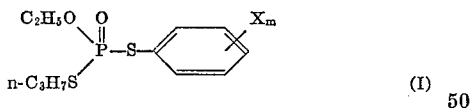

(I)

in which

X stands for a hydrogen or a halogen atom or a lower alkyl group, and m is 1 or 2.

2. Compounds according to claim 1 in which X stands for a hydrogen or a chlorine atom or a methyl or tert.-butyl group.

3. Compound according to claim 1 wherein such compound is O-ethyl-S-propyl-S-phenyl-dithiophosphate of the formula

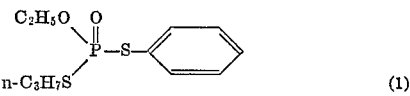

(1)

4. Compound according to claim 1 wherein such compound is O-ethyl-S-propyl-S-(2-methylphenyl)-dithiophosphate of the formula

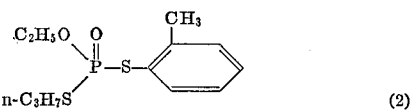

(2)

5. Compound according to claim 1 wherein such compound is O-ethyl-S-propyl - S - (3-methylphenyl)-dithiophosphate of the formula

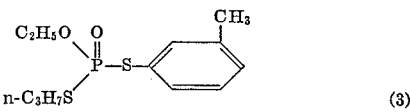

(3)

6. Compound according to claim 1 wherein such compound is O-ethyl-S-propyl-S-(4-methylphenyl)-dithiophosphate of the formula

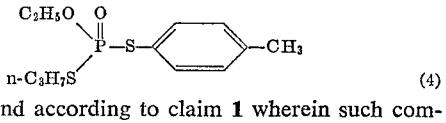

(4)

7. Compound according to claim 1 wherein such compound is O-ethyl-S-propyl-S-(4 - tert.butylphenyl)-dithiophosphate of the formula

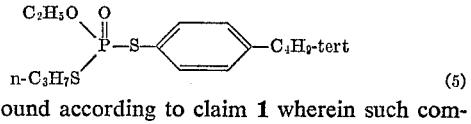

(5)

8. Compound according to claim 1 wherein such compound is O-ethyl-S-propyl-S-(4-chlorophenyl)-dithiophosphate of the formula

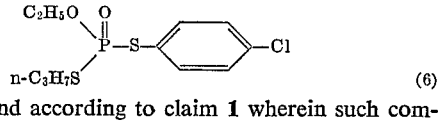

(6)

9. Compound according to claim 1 wherein such compound is O-ethyl-S-propyl-S-(2,5-dichlorophenyl)-dithiophosphate of the formula

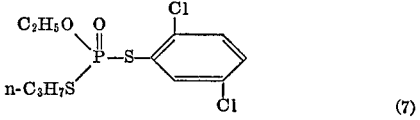

(7)

References Cited

Farben: C. A., vol. 58 (1963), 11276h.

LEWIS GOTTS, Primary Examiner

A. H. SUTTO, Assistant Examiner

U.S. Cl. X.R.

260—979; 424—225